Nov. 18, 1952     M. B. AUSTIN, JR     2,618,465

ROLLER GUIDE FOR HOSE AND THE LIKE

Filed Aug. 22, 1950

Inventor

Merritt B. Austin, Jr.

By Johnson and Kline

Attorneys

Patented Nov. 18, 1952

2,618,465

UNITED STATES PATENT OFFICE 2,618,465

ROLLER GUIDE FOR HOSE AND THE LIKE

Merritt B. Austin, Jr., Deerfield, Ill.

Application August 22, 1950, Serial No. 180,884

1 Claim. (Cl. 254—190)

This invention relates to a hose guide and more particularly to a device of this kind especially designed and adapted for use in connection with hose used in watering gardens or planted areas, and in wetting and washing various structures or equipment.

It is an object of the present invention to provide a hose guide which is capable of effectively guiding a watering or garden hose around various structures or buildings to protect the hose from scraping or abrading action which would shorten the life of the hose.

It is a further object of the present invention to provide a hose guide which is capable of effectively guiding a watering or garden hose around the margins of flower beds, gardens or other planted areas to avoid damage to the growing vegetation.

It is a still further object of the present invention to provide a hose guide which is capable of effectively and easily guiding a watering or garden hose around objects, or over obstacles, or around corners, and along comparatively long distances without becoming snarled or entangled.

An advantageous feature of the present invention is the provision of a hose guide which is capable of being readily installed in operating position and easily removed therefrom for transfer to a new position or for any other purpose.

Other objects, advantages and features of the present invention will appear in the following description of the preferred embodiment of the invention referring to the accompanying drawing in which.

Figure 3:
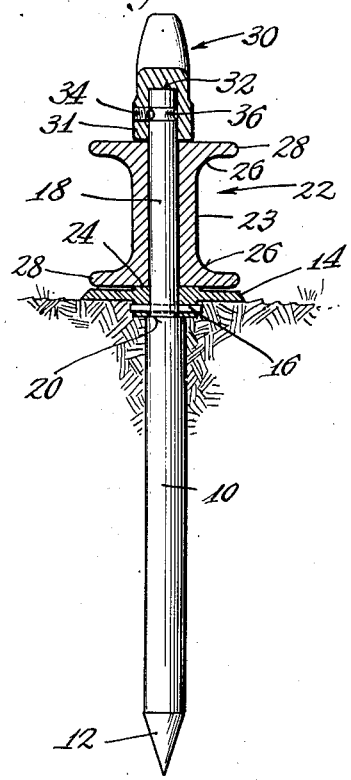
Fig. 3 is a cross-sectional view of the hose guide taken on the line 3—3 of Fig. 2.

In the embodiment of the invention as shown in the drawings, the hose guide comprises a ground penetrating or anchoring rod 10 having a pointed end 12 to facilitate the driving of the rod into the ground. An annular flange member 14 having a central opening of a size to permit passage therethrough of the anchoring rod is positioned on the anchoring rod 10 and is secured in place by a drive pin 16 which passes through aligned bored holes in a hub of the flange member 14 and the rod 10. If desired, the upper portion 18 of the rod 10 may be turned down to provide a shoulder 20 to assist in the positioning of the flange member 14 and to add to the support thereof. However, the turning down of rod 10 and the forming of the shoulder 20 may be dispensed with in the interests of economy and the anchoring rod 10 allowed to remain a constant diameter for substantially its full length, whereby the drive pin 16 would become the means of maintaining the flange 14 in position and preventing any movement thereof axially of the rod 10. As shown in Fig. 3, the anchoring rod 10 is driven into the ground until the flange 14 rests thereon and prevents any further penetration.

A hose guide roller 22, resembling a sheave or pulley wheel, is mounted to rotate on the upper portion of the anchoring rod 10 and is seated on the flange 14. The top surface of the flange 14 may have a smooth, finished boss or hub portion 24 of smaller diameter to decrease the frictional contact between the roller 22 and the flange 14.

The working face of the roller 22 has a cylindrical portion 23 which provides a smooth rolling surface for any hose in contact therewith. Hose retaining flanges 28 are positioned at the ends of the roller 22 to prevent the hose from slipping off the roller. These flanges 28 are joined to the cylindrical portion 23 by arcuate fillets 26 of a radius as to provide a smooth complementary surface for the hose being guided by the roller 22. It is, of course, apparent that various sizes of rollers could be provided for hose of different diameters, the hose of larger diameter requiring larger retaining flanges and arcuate fillets of a larger radius of curvature.

A handle member 30 has a hub portion 31 with a recess 32 therein of such a diameter as to be capable of being mounted on the upper end of the rod 10. The handle member 30 is slipped on the rod 10 and is secured in position by a set screw 34 which is threaded through the hub portion 31 and enters an annular notch 36 near the end of the rod 10. If desired, the set screw 34 may be replaced by a force fit drive pin similar to drive pin 16 to eliminate the necessity of the threaded set screw and the corresponding tapped hole in the handle portion 31 and decrease the cost of production of the guide roller.

The depth of the recess 32 in the handle and the relative positioning of the set screw 34 and the annular notch 36 is such that the lower edge portion of the handle does not normally contact the roller 22 which is therefore free to rotate easily on rod 10.

Figure 1:
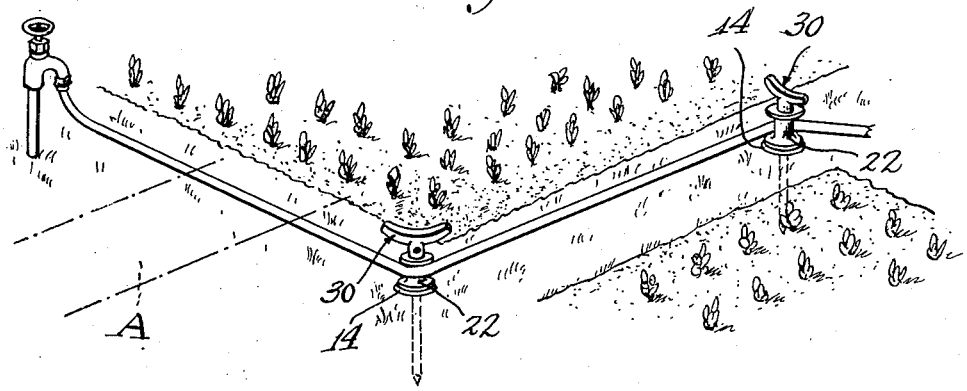
Figure 1 is a perspective view of the hose guide in use at the margins of a garden or planted area.
Figure 2:
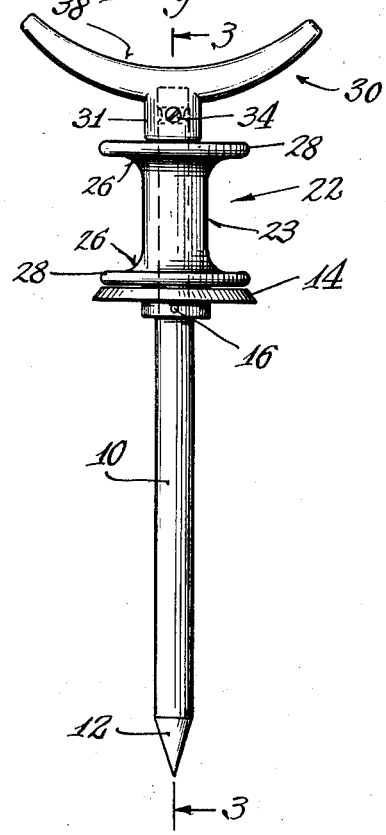
Fig. 2 is a plan view of the hose guide of the present invention.

The upper part 38 of the handle member 30 may be arcuately shaped, as shown in Figs. 1 and 2, and capable of receiving and retaining therein a garden hose to carry it clear of the ground and over obstacles or low shrubs. For example, should it be desired that the hose pass over a planted area A, indicated in dotted outline in Fig. 1, a hose guide could be positioned in the middle of the area A and at a sufficient height so that the hose will not come into contact with the flowers or plants. If a wider area is to be crossed, additional hose guides could be used.

Sufficient room is provided between the arcuately shaped upper part 38 of the handle member 30 and the upper hose retaining flange 28 so that one's fingers may be inserted therein for gripping purposes. This space should, of course, be kept to a minimum and the lower surface of the hub portion 31 should be kept reasonably close to the roller 22 to prevent excessive movement of said roller axially of said rod 10.

The hose guide is positioned by driving the rod 10 into the ground at the desired place. It has been found that the arcuate portion 38 of the handle 30, in addition to its hose guiding function, also serves to advantage during the positioning of the hose guide. It has been found easier to grasp the arcuate handle and apply force to drive the pointed rod 10 into the ground and, when one's foot is being used (as it usually is during the final stages of positioning), the arcuate portion provides for better gripping and assists the foot in maintaining its position and prevents the foot from slipping during such an operation.

The flange 14 which is secured to the rod 10 by means of the drive pin 16 limits the penetration of rod 10 into the ground and prevents it from being driven too deeply therein. Since the flange 14 cannot move axially of the rod 10 in the direction of the roller 22, there can be no change in the frictional contact between the flange and the roller, no matter how hard the hose guide is driven into the ground.

The hose guide is easily removed from the ground merely by gripping the arcuately shaped portion 38 of the handle member 30 and pulling the anchoring member 10 clear out of the ground.

From the foregoing description it will be seen that the invention provides a roller guide for hose and the like which effectively guides the same around or over various obstacles or objects whereby the hose is protected from abrasion and scraping or cutting action from more substantial structures it may contact and also prevents the hose itself from damaging other less substantial objects such as flowers, vegetables, plants, etc.

The manner of use is illustrated in Fig. 1 in conjunction with planted areas separated by foot paths such as are found in any garden or between flower beds. After the two sections illustrated have been watered and it is desired to move along to the next section, the hose is positioned against the rollers as shown and pulled along the ground. The rollers effectively guide the hose around and between the areas and avoid any possibility of damage to the areas or to the hose. As shown in Fig. 1, the hose has reached its full length in watering successive areas. The hose may be dragged back to the location of the water faucet by merely pulling on the end unscrewed from the faucet. A hose reel may be positioned thereat to facilitate the rerolling of the hose. It will be readily apparent that the hose will be effectively guided in its return movement as well as in its initial outgoing movement.

Although this invention has been illustrated and described primarily for use in gardens or other planted areas, it has also been found of use where the wetting and washing of various objects and structures is involved whenever the danger of scraping and abrading at sharp corners is possible. For example, the hose guide has been used in mink ranches where it is necessary to pull the hose along distances, between cages and around sharp corners. Another use has been in conjunction with the watering of elevated beds or trays of plants or vegetables in hot houses or open air vegetable markets, wherein the legs of the elevated beds or trays have prevented the smooth advancing movement of the watering hose.

The device is additionally suited for guiding articles similar to hose, such as ropes, cables, wire, etc., around corners or over obstacles to avoid scraping or abrading of the article itself as well as the objects with which sliding or rubbing contact would be made.

Variations and modifications may be made to the hose guide within the scope of the claim and portions of the improvements may be used without others.

I claim:

A hose guide of the character described, comprising a long cylindrical rod adapted to be driven into the ground a substantial distance; a guide roller carried by the upper end of the rod; a stop member on the rod limiting the downward movement thereof and a cross bar carried by the rod at its upper end having an abutment surface limiting the upward movement of the roller on the rod, said cross bar having sufficient width to have a person's foot applied thereto to force the rod into the ground and to serve as a handle in withdrawing the rod from the ground, said guide roller having a cylindrical body portion, flanges projecting therefrom at both ends and concave fillets connecting the surfaces of the flanges and cylindrical body portion, the flanges having substantial thickness and their peripheral portions being smooth and half-round in section to guide a hose back onto the cylindrical body portion should it tend to climb onto the flange in being run over the roller.

MERRITT B. AUSTIN, Jr.

REFERENCES CITED

The following references are of record in the file of this patent:

UNITED STATES PATENTS

| Number | Name | Date |
|---|---|---|
| 472,593 | Tache | Apr. 12, 1892 |
| 1,871,483 | Uitendaal | Aug. 16, 1932 |
| 1,968,357 | Schmiett | July 31, 1934 |
| 2,264,751 | Maxtone-Graham | Dec. 2, 1941 |
| 2,501,407 | Olsen et al. | Mar. 21, 1950 |